UNITED STATES PATENT OFFICE.

PAUL JULIUS, OF LUDWIGSHAFEN-ON-THE-RHINE, GERMANY, ASSIGNOR TO BADISCHE ANILIN AND SODA FABRIK, OF LUDWIGSHAFEN-ON-THE-RHINE, GERMANY, A CORPORATION OF GERMANY.

DISAZO DYE AND PROCESS OF MAKING SAME.

SPECIFICATION forming part of Letters Patent No. 716,242, dated December 16, 1902.

Application filed December 23, 1901. Serial No. 87,001. (Specimens.)

*To all whom it may concern:*

Be it known that I, PAUL JULIUS, a doctor of philosophy and a chemist, a subject of the Emperor of Austria-Hungary, residing at Ludwigshafen-on-the-Rhine, in the Kingdom of Bavaria, Germany, have invented new and useful Improvements in Disazo Dyes and Processes of Producing the Same, of which the following is a specification.

This invention relates to a secondary disazo dye which can be obtained by suitably combining the diazo compound of para-chlor-ortho-amido-salicylic acid with 1-naphthyl-amin-6-sulfo-acid, diazotizing the resulting product, and suitably combining the so-formed diazo compound with beta-naphthol. In place of the 1-naphthylamin-6-sulfo-acid above mentioned there may be employed 1-naphthylamin-7-sulfo-acid, or a mixture of both acids, such as is obtained in manufacturing operations, all of which sulfo-acids are to be hereinafter understood as being included in the generic term "Cleve's alpha-naphthylamin-monosulfo-acid."

The para-chlor-ortho-amido-salicylic acid above mentioned has hitherto not been prepared. A method of obtaining the same is hereinafter given.

The disazo dye above mentioned dyes wool from an acid-bath a violet-black color, which on treatment with bichromate of potash turns black.

In the following the nature of this invention is illustrated by means of examples; but the invention is not limited to the proportions and conditions therein given. The parts are by weight, and the temperature-degrees refer to the centigrade-scale.

*Example 1—Production of para-chlor-salicylic acid.*—Suspend one hundred and thirty-eight (138) parts of salicylic acid in seven hundred (700) parts of nitro-benzene and pass into it seventy-one (71) parts of chlorin, maintaining the temperature during this operation at from fifty (50°) to sixty (60°) degrees and agitating well the meanwhile. Extract the parachlor-salicylic acid from the nitro-benzene by means of a dilute aqueous solution of carbonate of soda, and from these watery extracts precipitate the free para-chlor-salicylic acid by means of hydrochloric acid. The crude product so obtained usually carries more than ninety (90) per cent. of the pure para-chlor-salicylic acid.

*Example 2—Production of nitro-chlor-salicylic acid.*—Dissolve three hundred and forty-four (344) parts of para-chlor-salicylic acid in sixteen hundred (1,600) parts of sulfuric acid containing ninety-six per cent. of sulfuric acid ($H_2SO_4$) at a temperature of from thirty (30°) to forty (40°) degrees. Now cool the whole to a temperature ranging from five degrees below zero ($-5°$) to zero degrees and add to it a mixture of two hundred and eighteen (218) parts of nitric acid containing sixty-two (62) per cent. of nitric acid ($HNO_3$) and two hundred and eighteen (218) parts of sulfuric-acid containing one hundred per cent. of sulfuric acid ($H_2SO_4$,) (so-called "monohydrate,") stirring the meanwhile, care being taken that during this operation the temperature of the mixtures does not rise above zero degrees. Stir until a test carried out by means of the Lunge nitrometer shows that nitration is practically completed. This is usually effected in from three (3) to four (4) hours. When nitration is practically completed, pour the result upon about two thousand (2,000) parts of ice, collect the acid in any suitable manner, such as filtration and subsequent pressing.

*Example 3—Production of para-chlor-ortho-amido-salicylic acid.*—For this it is recommended to employ the moist press-cake resulting from Example 2. Take three hundred and seventy-five (375) parts of nitro-para-chlor-salicylic acid or a corresponding amount of moist press-cake and stir it up with five-hundred (500) parts of water and add a saturated solution of carbonate of soda until evolution of gas ceases. Now add two thousand and seven hundred (2,700) parts of a solution of bisulfite of soda registering about 40° on a Baumé hydrometer. Heat this result to boiling under a return-condenser and maintain it so for from one and a-half to three hours. Now add twelve hundred (1,200) parts of hydrochloric acid containing about thirty-three (33) per cent. of hydrochloric acid (HCl) and boil until the sulfurous acid has been expelled. The new chlor-amido-salicylic acid is now present partially in solution (probably as hydrochloric-acid salt) and partly as undissolved free acid. The free acid may be obtained from the hydrochloric-acid salt by careful addition of carbonate of soda. This new chlor-amido-salicylic acid, which occurs in flat needles, can also be obtained by careful addition of hydrochloric acid to a solution of the sodium salt. The acid is difficultly soluble in cold water, difficultly soluble in alcohol, and melts at about two hundred and thirty-six (236°) degrees, decomposing at the same time. The sodium salt occurs in short needles, is soluble in water, and may be precipitated from this solution by means of common salt. The hydrochloric-acid salt of this new chlor-amido-salicylic acid is quite readily soluble in an excess of hydrochloric acid.

*Example 4—Production of the dye para-chlor-ortho-amido-salicylic acid-azo-alpha-naphthylamin-monosulfo-acid-azo-beta-naphthol.*—Dissolve eighteen and seventy-five hundredths ($18\tfrac{75}{100}$) (one-tenth molecular proportion) parts of para-chlor-ortho-amido-salicylic acid in six hundred (600) parts of hot water and the necessary amount of carbonate of soda. Cool to 10° and add a concentrated aqueous solution of sodium nitrite containing six and nine-tenths ($6\tfrac{9}{10}$) parts of that salt, (one-tenth molecular proportion.) Then add rapidly thirty-five (35) parts of hydrochloric acid containing thirty-three (33) per cent. of hydrochloric acid (HCl) (three-tenths ($\tfrac{3}{10}$) molecular proportion.) The diazotation takes place rapidly. The resulting yellow diazo compound separates out in great part in the form of yellow needles and is introduced into a solution of twenty-four and five-tenths ($24\tfrac{5}{10}$) parts of the sodium salt of Cleve's alpha-naphthylamin-monosulfo-acid (one-tenth ($\tfrac{1}{10}$) molecular proportion) (preferably the crude acid, which is a mixture of 1-naphthylamin-6-sulfo-acid and of 1-naphthylamin-7-sulfo-acid) in four hundred (400) parts of water. Stir for about one (1) hour and add thirteen and six-tenths ($13\tfrac{6}{10}$) parts (one-tenth ($\tfrac{1}{10}$) molecular proportion) of crystallized sodium acetate. Stir for seven (7) hours while maintaining the temperature at about forty (40°) degrees. Let it stand over night. This completes the combination. The next step may be carried out on the result of the preceding operation itself, or the intermediate product may be precipitated from this result by means of about fifty (50) parts of hydrochloric acid containing thirty-three (33) per cent. of hydrochloric acid (HCl) and then filtered off. In either case a complete solution of the intermediate product is effected by means of the necessary quantity of carbonate of soda, and to this solution there is added a concentrated aqueous solution of sodium nitrite containing six and nine-tenths ($6\tfrac{9}{10}$) parts (one tenth ($\tfrac{1}{10}$) molecular proportion) of that salt. Now add a sufficient quantity of ice and sixty (60) parts of hydrochloric acid containing thirty-three (33) per cent. of hydrochloric acid, (HCl). Stir for about one-half ($\tfrac{1}{2}$) hour. At the end of that time the diazo compound, which is difficultly soluble in water, will be formed. Introduce this result into a solution made from sixteen (16) parts of beta-naphthol, (about one-tenth ($\tfrac{1}{10}$) molecular proportion), twelve (12) parts of caustic-soda lye containing thirty-five (35) per cent. of caustic soda (NaOH) (one-tenth ($\tfrac{1}{10}$) molecular proportion,) fifty-five (55) parts of calcined carbonate of soda, and five hundred (500) parts of water. Stir for about three (3) hours. The dye will then have separated out completely and can be collected by any suitable means, such as filtering and pressing. The so-resulting product in the dry and powdered state is a greenish-black powder having a metallic sheen which gives a red-violet solution in cold water, which solution is not affected in color by a small quantity of carbonate of soda. A larger quantity of carbonate of soda, however, produces a brown-red precipitate. Addition of hydrochloric acid to the aqueous solution produces a violet-red precipitate. The dye gives an indigo-blue solution with caustic-soda lye and a dark-blue color with concentrated sulfuric acid. The dye dyes wool a violet-black shade, which on treatment with bichromate of potash becomes a deep black, which resists the effect of external influences, such as fulling, washing, potting, ironing, and the like. The shades produced are likewise exceedingly level.

What is claimed is—

1. Process for the production of an azo dye which consists in treating salicylic acid successively with chlorin, nitric acid, bisulfite of soda, nitrous acid, combining the resulting ortho-diazo-para-chlor-salicylic acid with Cleve's alpha-naphthylamin-monosulfo-acid, treating the resulting product with nitrous acid and combining the resulting diazo compound with beta-naphthol.

2. Process for the production of an azo dye which consists in treating para-chlor-salicylic acid successively with nitric acid, bisulfite of soda, nitrous acid, combining the resulting diazo-para-chlor-salicylic acid with Cleve's alpha-naphthylamin-monosulfo-acid, treating this result with nitrous acid and combining the resulting diazo compound with beta-naphthol.

3. Process for the production of an azo dye which consists in treating ortho-nitro-para-chlor-salicylic acid with bisulfite of soda, and then with nitrous acid, combining the resulting ortho-diazo-para-chlor-salicylic acid with Cleve's alpha-naphthylamin-monosulfo-acid, treating the resulting product with nitrous acid and combining the resulting diazo compound with beta-naphthol.

4. As a new article of manufacture the azo dye which can be obtained by combining diazotized ortho-amido-para-chlor-salicylic acid with Cleve's alpha-naphthylamin-monosulfo acid, diazotizing this product and combining the resulting diazo compound with beta-naphthol, which dyes wool in shades which are converted into deep black by bichromate of potash and which is soluble in water giving a red-violet color which remains unchanged by small amounts of carbonate of soda but which solution yields a precipitate with an excess of carbonate of soda and with hydrochloric acid, and which dye dissolves in caustic soda with a blue color and gives a dark-blue color with concentrated sulfuric acid.

In testimony whereof I have hereunto set my hand in the presence of two subscribing witnesses.

PAUL JULIUS.

Witnesses:
BERNHARD C. HESSE,
JACOB ADRIAN.